United States Patent [19]
Togoshi et al.

[11] Patent Number: 6,082,086
[45] Date of Patent: Jul. 4, 2000

[54] REEL MOWER APPARATUS

[75] Inventors: Yoshikazu Togoshi, Osaka; Yoshiyuki Esaki; Yoshihiro Kawahara, both of Sakai; Teruo Shimamura, Nishinomiya; Junichi Kitamura, Kawachinagano; Osami Fujiwara, Kishiwada; Hideya Umemoto; Koji Fujiwara, both of Sakai, all of Japan

[73] Assignee: Kubota Corporation, Japan

[21] Appl. No.: 09/062,051

[22] Filed: Apr. 17, 1998

[30] Foreign Application Priority Data

| Jul. 31, 1997 | [JP] | Japan | 9-205635 |
| Jul. 31, 1997 | [JP] | Japan | 9-205636 |
| Sep. 19, 1997 | [JP] | Japan | 9-255433 |

[51] Int. Cl.[7] .................................................. A01D 34/48
[52] U.S. Cl. ..................................... 56/199; 56/7; 56/249
[58] Field of Search .............................. 56/7, 200, 199, 56/202, 249, 294

[56] References Cited

U.S. PATENT DOCUMENTS

| 3,753,340 | 8/1973 | Mathews | 56/200 |
| 4,191,007 | 3/1980 | Check et al. | 56/199 |
| 4,777,786 | 10/1988 | Arnold | 56/199 |
| 4,833,800 | 5/1989 | Ting. | |
| 4,970,852 | 11/1990 | Check et al. | 56/199 |
| 5,042,236 | 8/1991 | Lamusga et al. | 56/7 |
| 5,412,931 | 5/1995 | Reichen et al. | 56/199 |

FOREIGN PATENT DOCUMENTS

S5629912  3/1981  Japan.

*Primary Examiner*—H. Shackelford
*Attorney, Agent, or Firm*—Webb Ziesenheim Logsdon Orkin & Hanson, P.C.

[57] ABSTRACT

A reel-type cutting unit including a reel blade for cutting grass in cooperation with a fixed blade. The reel blade is rotatable about a horizontal axis extending transversely of a vehicle body, to move from front to rear relative to the fixed blade with respect to a forward traveling direction of the vehicle body. The cutting unit has a main case surrounding the reel blade to define a space for carrying grass clippings in a rotating direction of the reel blade to a top level of the reel blade. A guide member is connected to the main case for receiving the grass clippings carried to the top level. The guide member defines a grass receiving space having a grass discharge opening. The grass discharge opening is connected to a grass catcher through a duct.

15 Claims, 18 Drawing Sheets

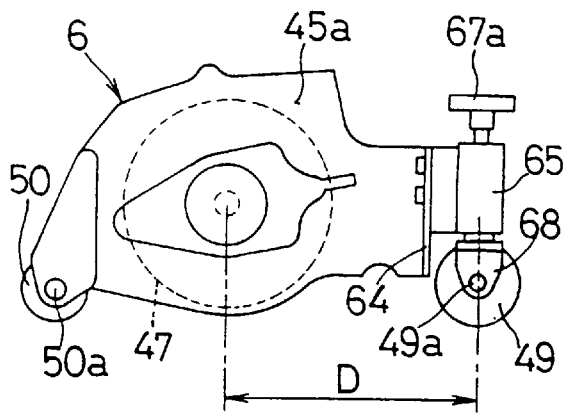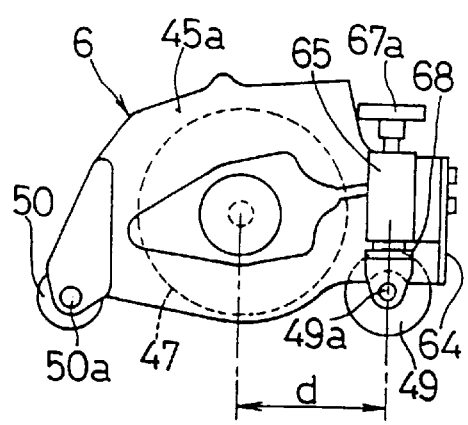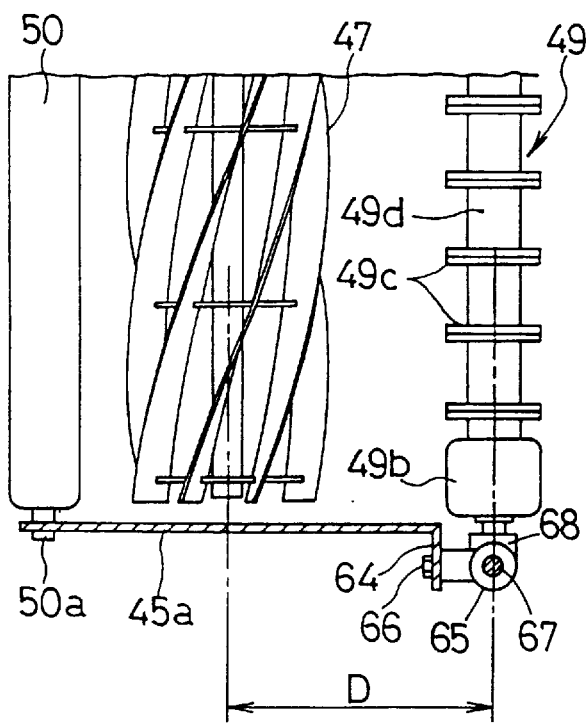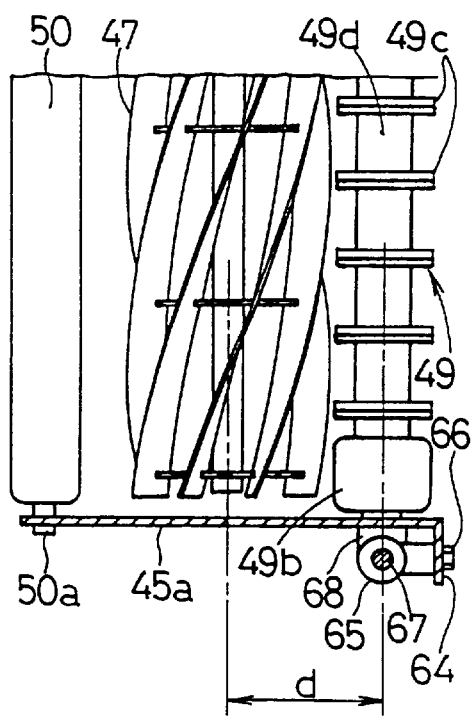

REEL MOWER APPARATUS

BACKGROUND OF THE INVENTION

1. Field of the Invention

This invention relates to a reel mower apparatus having a reel-type cutting unit or units attached to a vehicle body for cutting grass, and a duct for transmitting grass clippings through a duct to a grass catcher attached to the vehicle.

2. Description of the Related Art

A reel type lawn tractor of the type Doted above is disclosed in Japanese Patent Laying-Open Publication S56-29912, for example. This conventional tractor has ducts for transmitting grass clippings obliquely upward from rear positions of a reel-type cutting unit. The lawn tractor which collects grass cut by the reel-type cutting in a grass catcher through the ducts can dispense with an operation to collect grass clippings from the ground with a sweeper or the like, thereby allowing a grass cutting operation to be carried out more efficiently than the type of tractor which discharges grass clippings to the ground. However, in the conventional lawn tractor noted above, the reel-type cutting unit has an open front, and feeds grass clippings straight into the ducts. Since, with such a construction, the rotating reel cannot apply sufficient kinetic energy to the grass clippings, high performance blows are required to collect the grass clippings completely.

U.S. Pat. No. 4,777,786 discloses a construction including an auger for gathering grass cut by a reel-type cutting unit once in a duct. According to this construction, glass clippings are reliably fed to the duct and collected in a grass catcher. Its disadvantage is that the reel-type cutting unit has a complicated construction and is high cost because of the driven type auger being additionally included.

SUMMARY OF THE INVENTION

The object of this invention is to provide a reel mower apparatus having reel-type cutting units of simple construction not employing a driven type transport device, and yet capable of reliably feeding grass clippings to a duct.

The above object is fulfilled, according to this invention, by a reel mower apparatus comprising:
- a vehicle body;
- a grass catcher attached to the vehicle body;
- a reel-type cutting unit coupled to the vehicle body and including:
  - a fixed blade disposed adjacent the ground;
  - a reel blade for cutting grass in cooperation with the fixed blade, the reel blade being rotatable about a horizontal axis extending transversely of the vehicle body, to move from front to rear relative to the fixed blade with respect to a forward traveling direction of the vehicle body;
  - a main case surrounding the reel blade to define a space for carrying grass clippings in a rotating direction of the reel blade to a top level of the reel blade; and
  - a guide member connected to the main case for receiving the grass clippings carried to the top level, the guide member defining a grass receiving space having a grass discharge opening, the grass clippings received being transported to the grass discharge opening by air flows; and
- a duct having one end thereof connected to the grass discharge opening and the other end connected to the grass catcher for transporting the grass clippings as entrained by the air flows.

According to this construction, grass clippings cut by the shearing action of the reel blade and fixed blade are directly subjected to the rotational force of the reel blade and/or exposed to air flows generated by the rotating reel blade. Consequently, the grass clippings are carried from a position under the reel blade around a region behind the reel blade to the top level, and fed into the grass receiving space. Thereafter the grass clippings are transported out of the grass discharge opening and through the duct to the grass catcher to be collected therein. Thus, in this invention, sufficient kinetic energy is applied to the grass clippings cut in the position under the reel blade, whereby the grass clippings may be fed to the duct only by means of air flows. Particularly where the grass receiving space is located forwardly of the reel blade with respect to the forward traveling direction of the vehicle body, sufficient kinetic energy is applied to the grass clippings in the course of movement from the position under the reel blade to the top level, to be fed to the grass receiving space. The grass clippings may be fed into the duct reliably without requiring any mechanical transport device operable in the grass receiving space.

In one preferred embodiment of this invention, the grass discharge opening is located adjacent a middle position of the reel blade extending transversely of the vehicle body, the grass receiving space having a width perpendicular to the axis of the reel blade which increases in a direction toward the grass discharge opening to reach a maximum width in a position of the grass discharge opening. The main case has a width extending perpendicular to the axis of the rotation of the reel and the grass discharge opening is smaller than the width of the main case. In this construction, the grass discharge opening is at an equal distance from transversely opposite ends of the reel blade, and grass clippings emerging from the opposite ends are, while being carried forward, drawn along inner surfaces of the case toward a transversely middle position to reach the discharge opening. This feature is effective to suppress stalling of the grass clippings through contact with the inner surfaces of the case, thereby assuring an improved grass discharge performance.

In another preferred embodiment of this invention, the reel blade is in spiral form, the grass discharge opening being located downstream of air flows produced by the reel blade in spiral form. With this construction, the spiral reel blade causes grass clippings cut and discharged as entrained by air flows to shoot off as deflected from a direction perpendicular to the rotational axis of the reel blade, to a direction along the spiral. The grass receiving space is shaped to match the direction in which the grass clippings are deflected, with the discharge opening located in a downstream position. Consequently, the grass clippings flow smoothly in the grass receiving space, hence an improved grass transporting efficiency.

In a further preferred embodiment of this invention, the grass receiving space is curved substantially in arcuate form in a vertical plane to reverse a transport direction of the grass clippings. In this case, the grass clippings fed into the grass receiving space disposed forwardly are smoothly deflected backward to reach the duct.

Preferably, the guide member is detachably attached to the main case. When the guide member is detached, grass clippings may be discharged through the opening thereby formed. For example, the grass clippings may be thrown out onto the ground when such an operation is required. Alternatively or additionally, the main case may include a rear wall having a lid switchable between an open position and a closed position. When the lid is closed, the grass clippings carried by the reel blade are discharged through the duct as described hereinbefore. When the lid is opened, the grass clippings are discharged through the opening thereby formed. That is, switching may be made between a mode for collecting grass clippings, and a mode for throwing out the grass clippings before reaching the duct which is retained in place.

In a still further embodiment of this invention, the main case may includes side walls with lower edges thereof spaced from the ground to define an air intake path for allowing air inflow. With rotation of the reel blade, ambient air is drawn in from the air intake path whereby grass clippings are transported by a sufficient amount of air flow generated by the reel blade.

Preferably, the reel-type cutting unit is supported by the vehicle body to be pivotable about a vertical axis disposed in a middle position of the reel-type cutting unit extending horizontally and transversely of the vehicle body. Depending on conditions of the ground, the reel-type cutting unit may be subjected to a resistance acting on one end thereof. In such a case, the cutting unit is allowed to pivot about the vertical axis, thereby avoiding an excessive external force acting thereon. Where the grass discharge opening is disposed adjacent the vertical axis, the discharge opening is displaceable only by a small amount with the pivotal movement of the cutting unit. There is little chance of the pivotal movement being prevented by an interference with the duct. Only little play may be provided between the discharge opening and the duct to allow the pivotal movement.

In a different aspect of this invention, there is provided a reel mower apparatus comprising a plurality of reel-type cutting units, and a duct assembly connected to the grass discharge opening. The duct assembly preferably includes a plurality of first ducts, each connected at one end thereof to the grass discharge opening, a second duct connected at one end thereof to the grass catcher, a merge unit connected to the other end of each of the first ducts and to the other end of the second duct, and a support member for attaching the merge unit to the vehicle body.

With this construction, the grass clippings exiting the plurality of first ducts join in the merge unit to be transmitted to the grass catcher through the second duct. This construction not only provides simplified transmitting paths compared with the case where a plurality of ducts are connected to the grass catcher, but avoids sagging of the merge unit since the merge unit is supported by the vehicle body through the support member. That is, the transmitting paths of grass clippings are simplified with the merge unit supported by the vehicle body, and only a simple support structure is required for supporting this single merge unit.

Preferably, the second duct includes a blower disposed below the merge unit. With this construction, grass clippings are effectively transmitted by air flows generated by the blower. Since the blower is located in a lowermost position of the duct assembly, grass clippings may be fed to the blower by gravity even when the grass clippings stall in the duct assembly. Thus, grass clippings may be transmitted efficiently without any stagnation.

Other features and advantages of this invention will be apparent from the following description of embodiments to be taken in conjunction with the drawings.

BRIEF DESCRIPTION OF THE DRAWINGS

FIGS. 11A and 11B are side views showing two attaching positions of a front ground-engaging roller.

FIGS. 12A and 12B are plan views showing the two attaching positions of the front ground-engaging roller.

DESCRIPTION OF THE PREFERRED EMBODIMENTS

Figure 1:
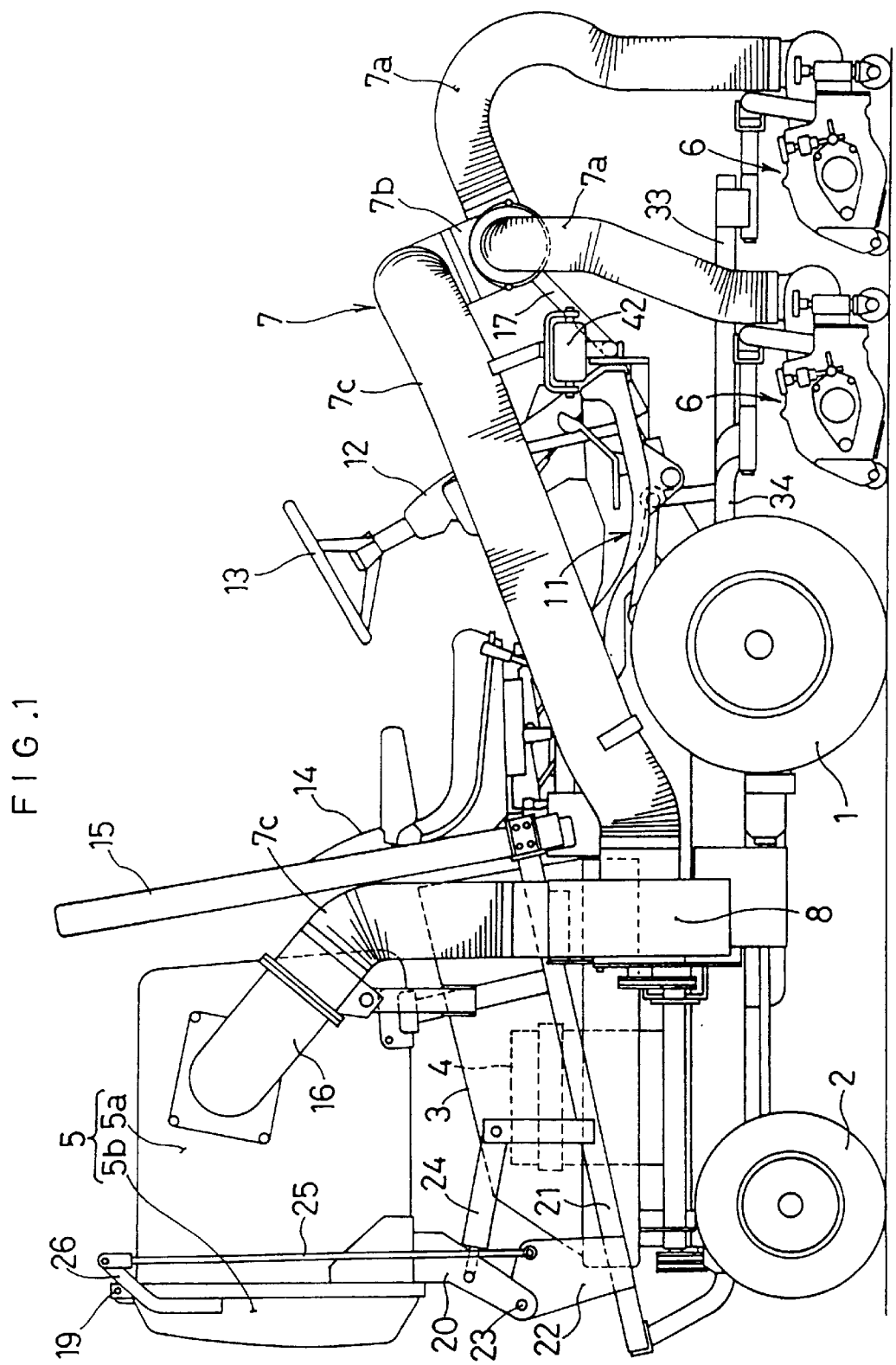
FIG. 1 is a side elevation of a lawn tractor in a first embodiment of this invention.

As shown in FIGS. 1 through 4, a riding lawn tractor includes a vehicle body having front drive wheels 1 and dirigible rear drive wheels 2. An engine hood 3 enclosing an engine 4 is disposed in a rearward position of the vehicle body. A grass catcher 5 is disposed above the engine hood 3. The tractor further includes three reel-type cutting units 6 vertically movably connected to a forward end of the vehicle body. Grass clippings are transmitted from the respective cutting units 6 to the grass catcher 5 through a duct 7 and a suction blower 8.

Figure 5:
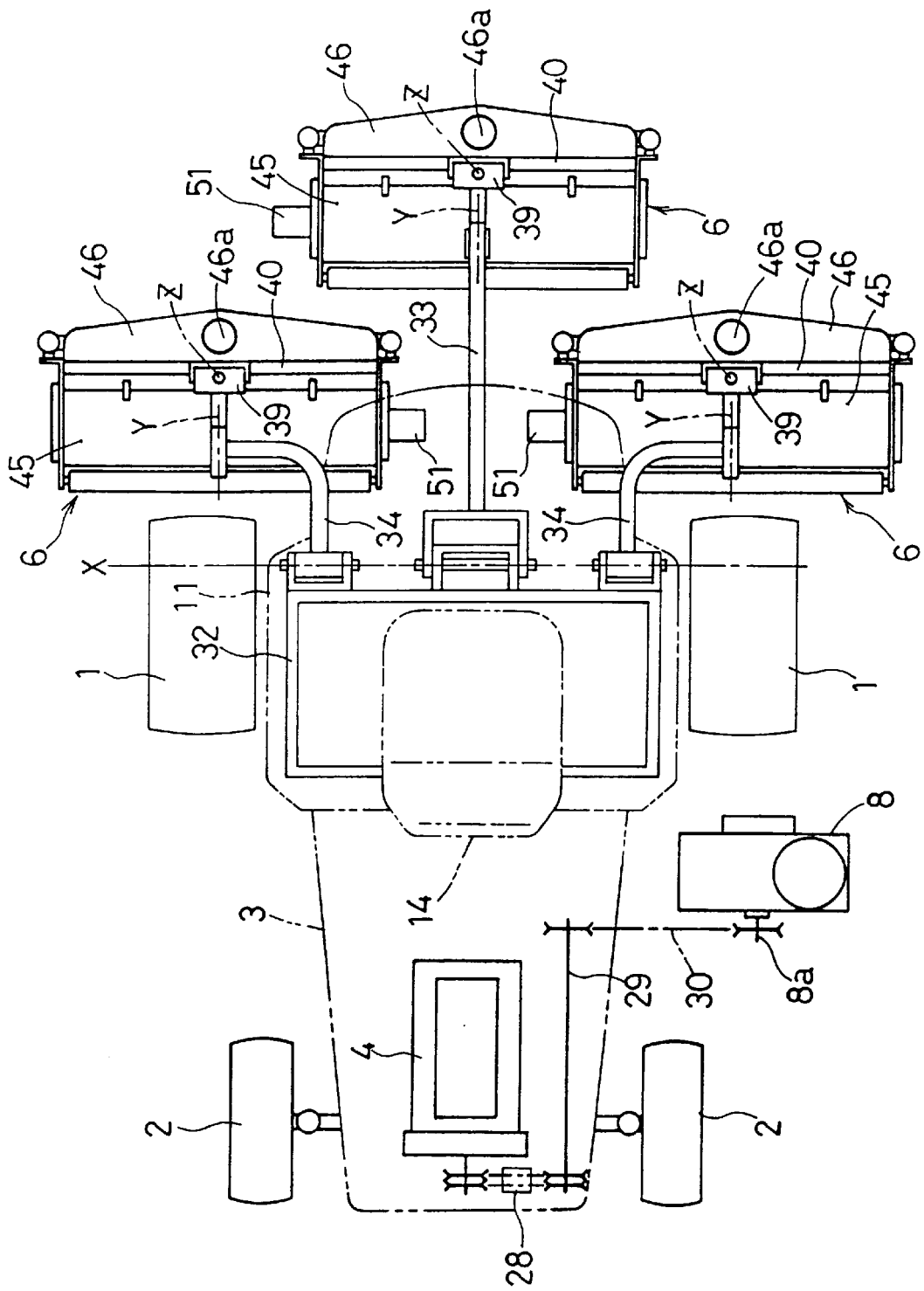
FIG. 5 is a schematic plan view of the lawn tractor shown in FIG. 1.

A footrest 11 is formed on the vehicle body to open forwardly and laterally thereof A steering column 12 is erected at the front of footrest 11, with a steering wheel 13 attached to an upper end of steering column 12. A driver's seat 14 is disposed rearwardly of footrest 11. Further, a loop-like protector frame 15 is provided for protecting upper and lateral areas of driver's seat 14. As shown in FIG. 5, the reel-type cutting units 6 are arranged in a middle position transversely of the vehicle body, and at opposite sides rearwardly of the middle position. The side cutting units 6 have cutting widths whose inward areas overlap opposite side areas of a cutting width of the center cutting unit 6.

The duct 7 includes three first flexible ducts 7a for transmitting grass clippings from the three reel-type cutting units 6, respectively, a merging member 7b for joining the three first ducts 7a at the front of the vehicle body, and a second flexible duct 7c having a larger diameter than the first ducts 7a for transmitting grass clippings from the merging member 7b. The second duct 7c extends from the front to a lateral position of the vehicle body. The suction blower 8 is disposed in an intermediate position of the second duct 7c extending laterally of the vehicle body. Grass clippings delivered upward from the suction blower 8 through the second duct 7c enter a receiving tube 16 of grass catcher 5 through an opening formed in oblique posture at the upper end of the second duct 7c. The merging member 7b is formed of metal, and includes a cylindrical portion opening forward, right and left for connection to the first ducts 7a, and a cylindrical portion opening upward for connection to the second duct 7c. The merging member 7b is fixedly supported by a prop 17 in a forward and transversely middle position of the vehicle body.

As shown in FIG. 1, the portion of the second duct 7c forwardly of the suction blower 8 extends obliquely from the highest position right over the connection to the merging member 7b to the lowest position at the connection to the suction blower 8. This posture allows little chance of grass clippings remaining in the second duct 7c.

As shown in FIG. 1, the grass catcher 5 includes a main container body 5a defining an opening directed rearward in the posture shown, and a lid 5b attached to an upper edge of the opening through hinges 19. The grass catcher 5 has a bracket 20 disposed under the opening. A lower end of the bracket 20 is connected to a stay 22 formed on a support frame 21 in the rearward position of the vehicle body to be pivotable about transverse support pins 23. Thus, the entire grass catcher 5 is switchable between a grass collecting position shown in FIG. 1 and a grass discharge position shown in FIG. 2. The grass clippings delivered from the receiving tube 16 along with air flows fall by gravitation as the air flows slow down within the grass catcher 5. Air is released outside the grass catcher 5 from an upper interior space thereof through exhaust passages (not shown) formed in a rear surface of lid 5b.

Figure 2:
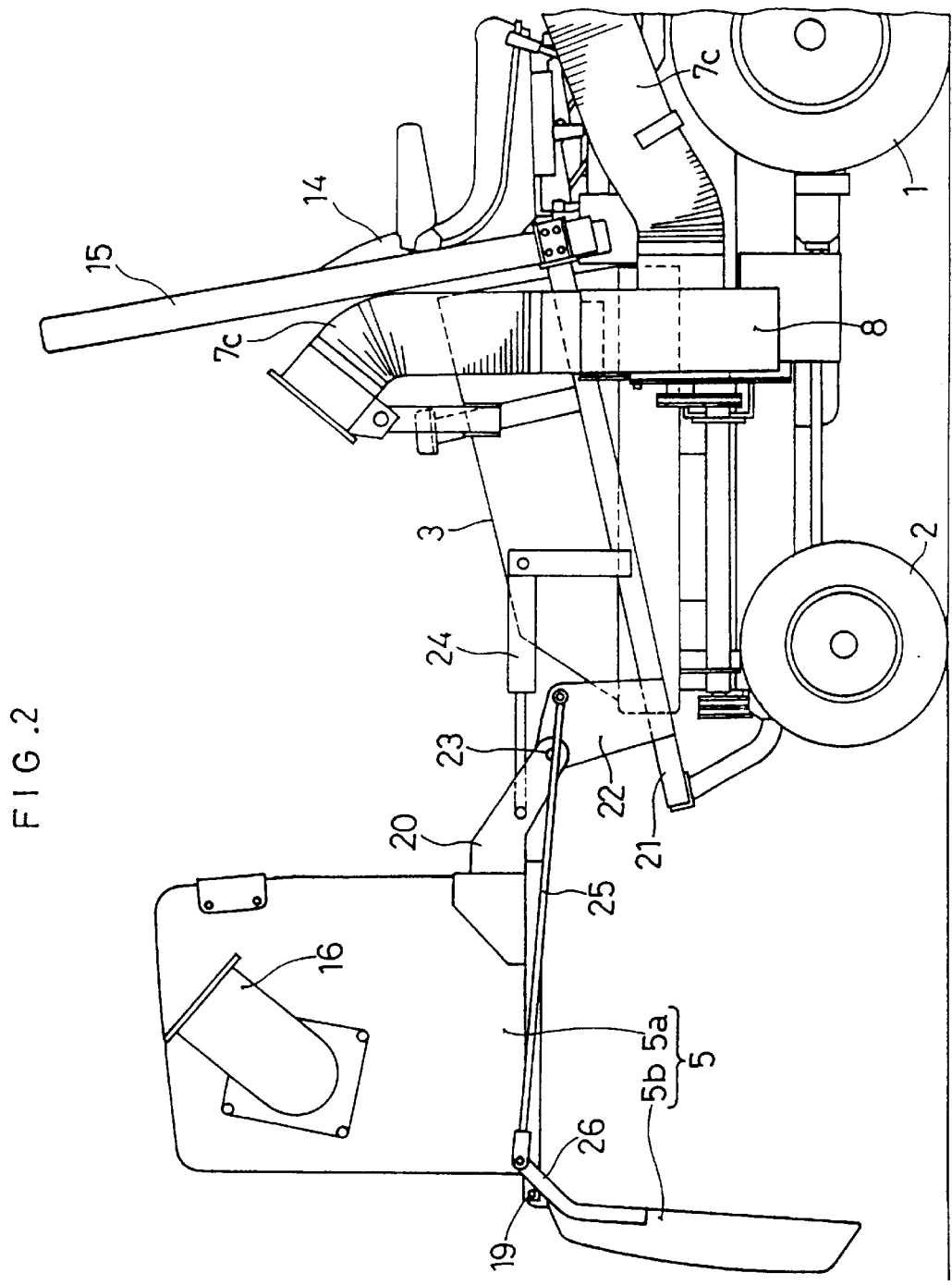
FIG. 2 is a side view of a grass catcher in a discharge position of the lawn tractor shown in FIG. 1.

A discharge cylinder 24 extends between the bracket 20 and support frame 21 for switching positions of the main container body 5a of the grass catcher. A link 25 extends between the stay 22 and an arm 26 connected to the lid 5b for opening and closing the lid 5b in response to position switching of the main container body 5a. When the discharge cylinder 24 is contracted, the main container body 5a is placed in the grass collecting position, and the lid 5b is closed as shown in FIG. 1. When the discharge cylinder 24 is extended, the main container body 5a is switched to the grass discharge position as shown in FIG. 2. In this position, the receiving tube 16 is separated from the upper end of the second duct 7c, and the opening of main container body 5a is directed downward with the lid 5b opened, to discharge grass clippings.

As shown in FIG. 5, the suction blower 8 includes a drive shaft 8a extending in the fore and aft direction. Power of engine 4 is transmitted to the drive shaft 8a through a belt tension type clutch 28, a transmission shaft 29 extending in the fore and aft direction, and a belt transmission mechanism 30 extending between the transmission shaft 29 and drive shaft 8a.

As shown in FIG. 5, a first arm 33 extending in the fore and aft direction of the vehicle body is connected to a transversely middle position at the forward end of a body frame 32 to be pivotable about a transverse axis X. Second arms 34 shaped to bend outwardly of the vehicle body as they extend forward are connected to opposite, right and left ends at the forward end of body frame 32 to be pivotable about the transverse axis X. The reel-type cutting units 6 are connected to forward ends of the first arm 33 and second arms 34, respectively.

Figure 6:
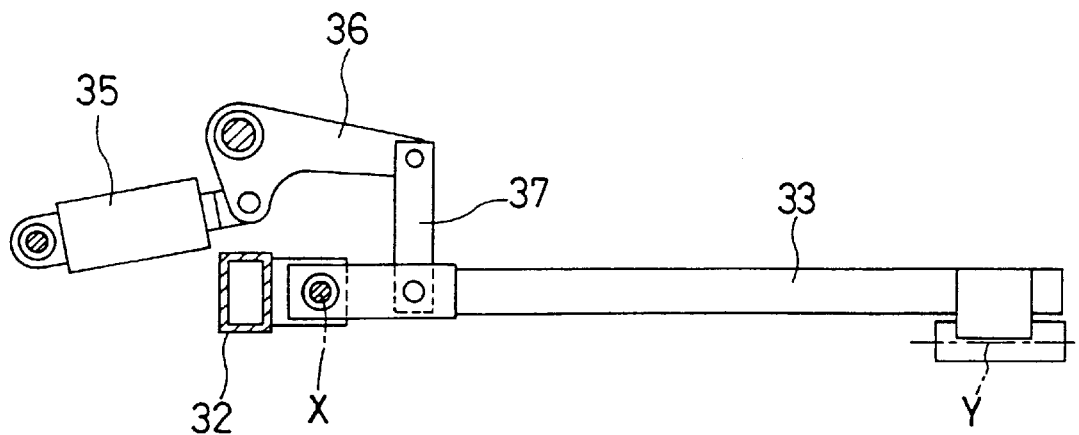
FIG. 6 is a side view of a lift structure for a first arm.
Figure 7:
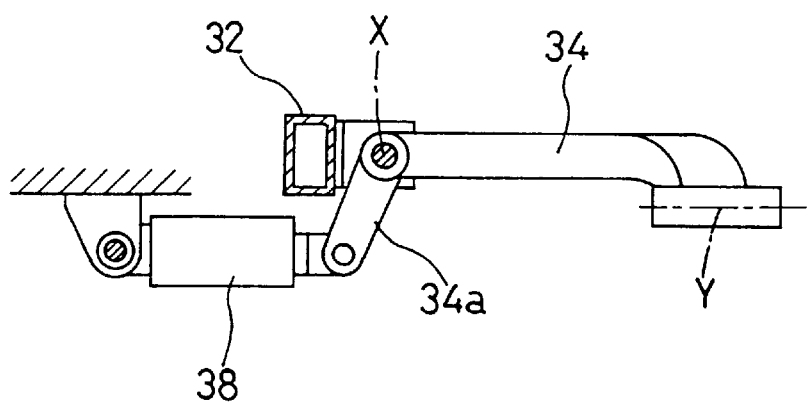
FIG. 7 is a side view of a lift structure for a second arm.

Specifically, as shown in FIG. 6, a lift arm 36 is disposed adjacent a proximal end portion of the first arm 33 to be raised and lowered by a first lift cylinder 35. The proximal end portion of the first arm 33 is suspended from the lift arm 36 through a link 37. As shown in FIG. 7, each of the right and left second arms 34 has an arm 34a connected to a proximal end portion to be pivotable therewith by a second lift cylinder 38. As shown in FIG. 5, each of the first arm 33 and second arms 34 has a forwardly opening channel-shaped support bracket 39 pivotable about a rolling axis Y extending in the fore and aft direction. The support bracket 39 supports a transversely middle position of a main frame 40 mounted in an upper position of the reel-type cutting unit 6 to be pivotable about a yawing axis Z extending vertically.

Figure 3:
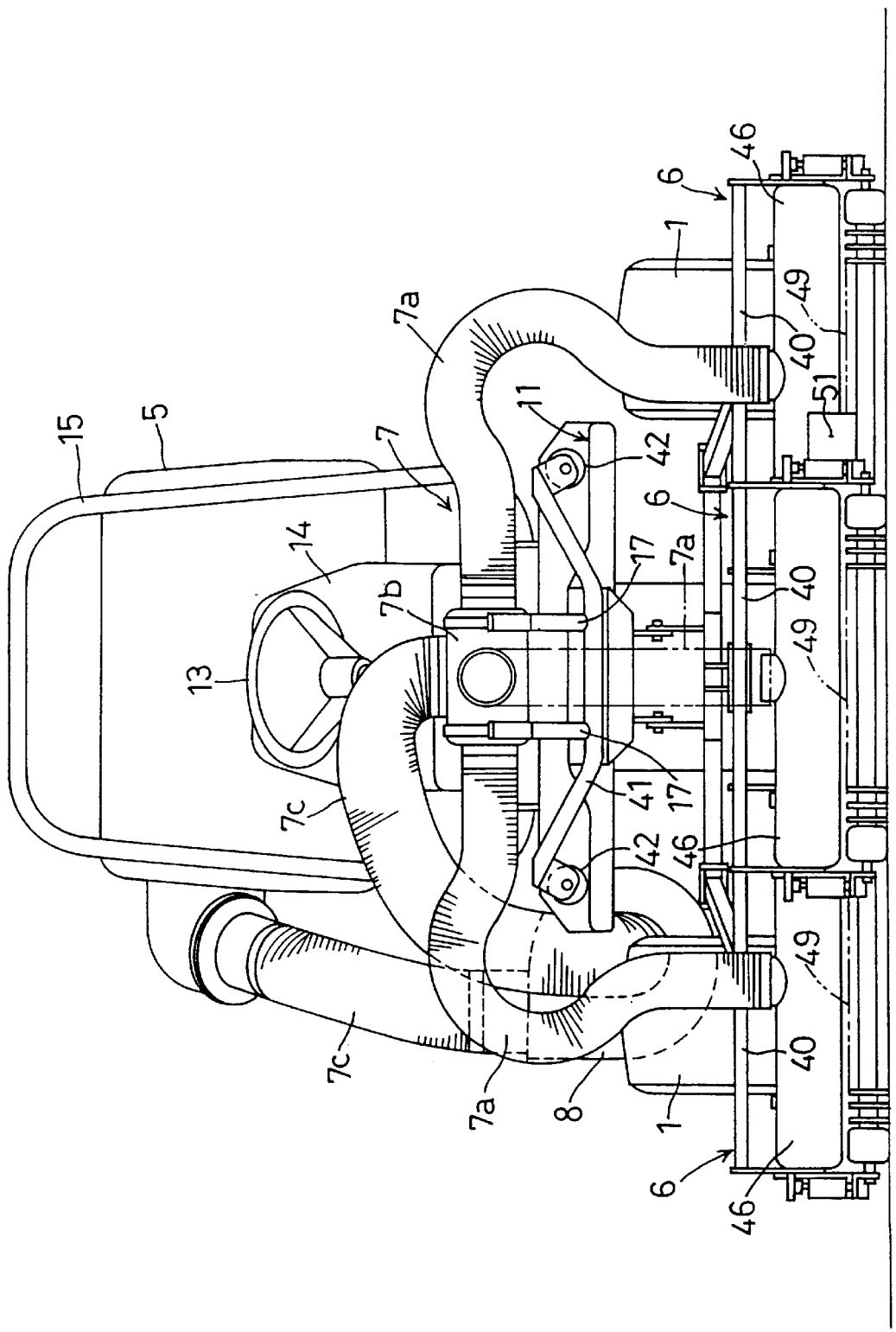
FIG. 3 is a front view of the lawn tractor shown in FIG. 1.
Figure 4:
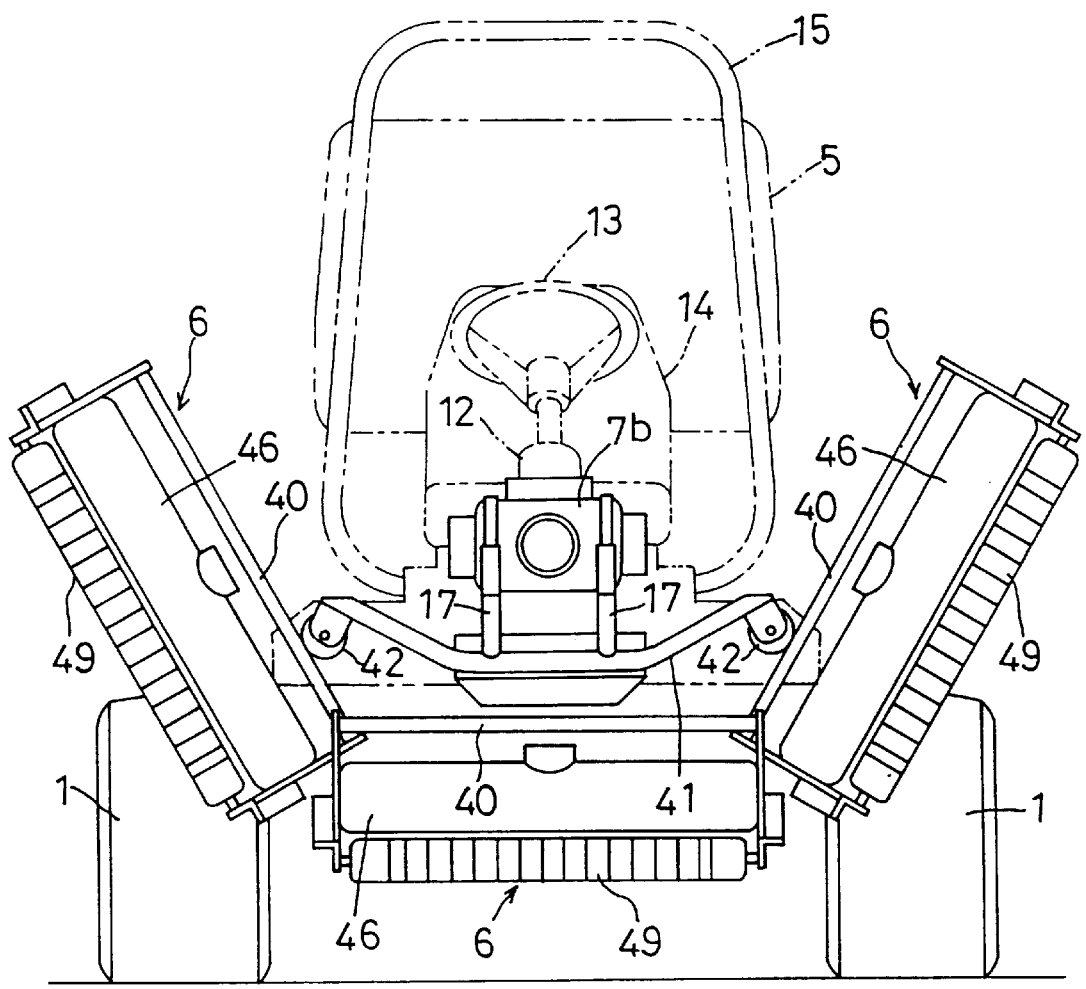
FIG. 4 is a front view showing reel-type cutting units in a raised position of the lawn tractor shown in FIG. 1.

As shown in FIGS. 3 and 4, the vehicle body includes a frame 41 disposed at the forward end thereof, which is shaped to extend upward and transversely outward. The frame 41 supports, at opposite, right and left ends thereof, contact rollers 42 formed of an elastic material such as rubber and rotatable about fore and aft axes. For raising the three reel-type cutting units 6, the first lift cylinder 35 and second lift cylinders 38 are extended at the same time. Then, as shown in FIG. 4, the contact rollers 42 contact the main frames 40 of right and left cutting units 6, whereby the cutting units 6 are swung about the rolling axes Y to inclined postures with the outward ends directed upward.

Figure 8:
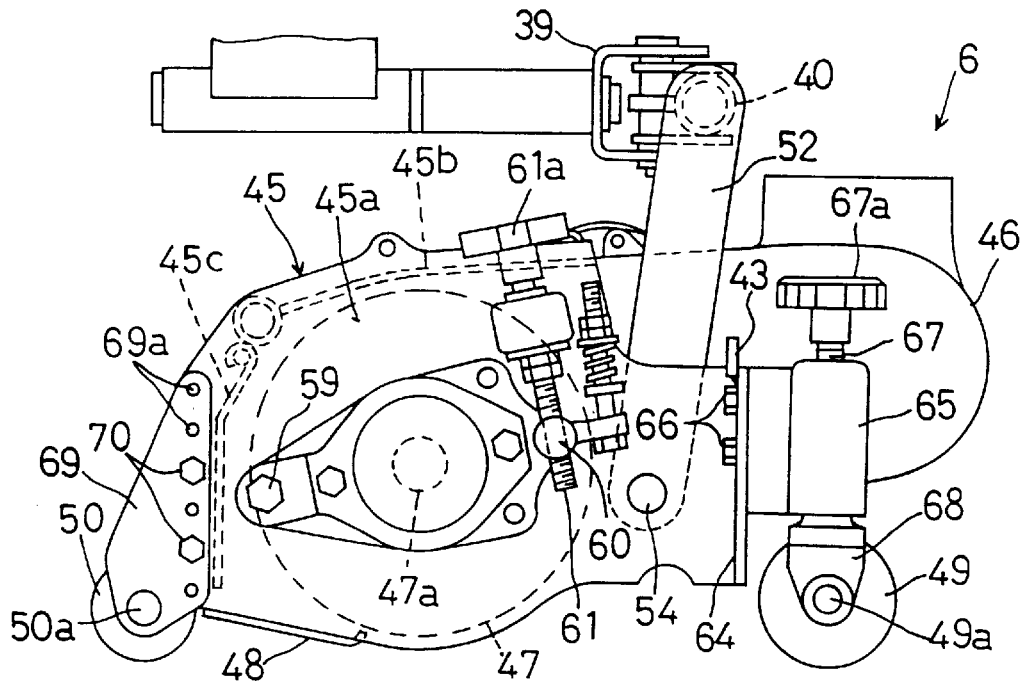
FIG. 8 is a side view of a reel-type cutting unit.
Figure 9:
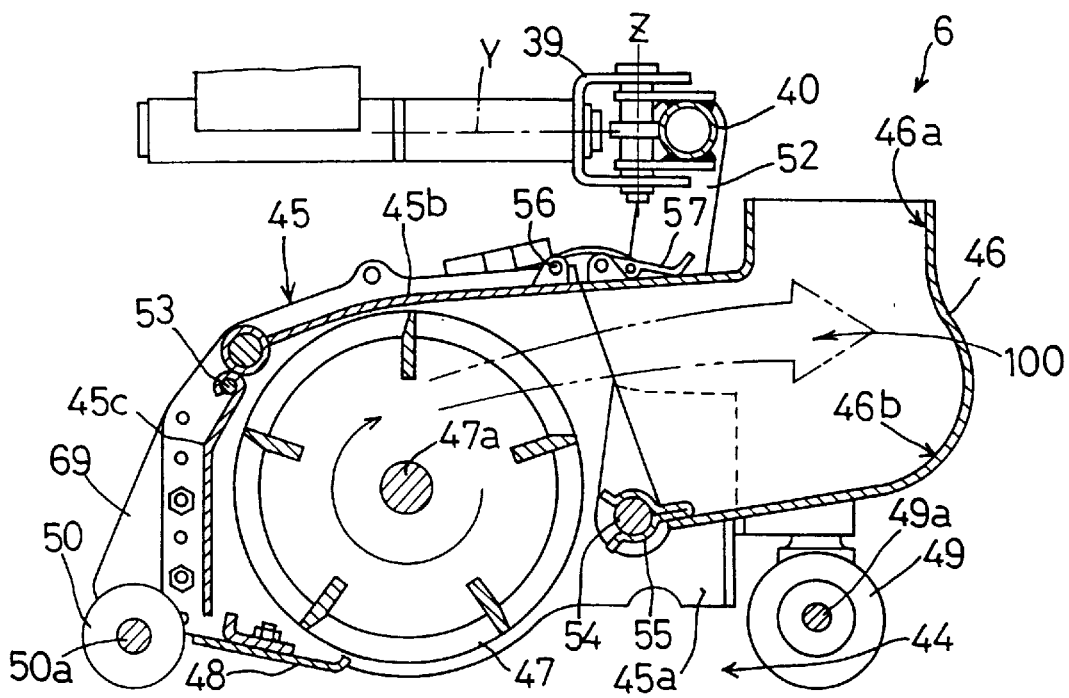
FIG. 9 is a side view in vertical section of the reel-type cutting unit.
Figure 10:
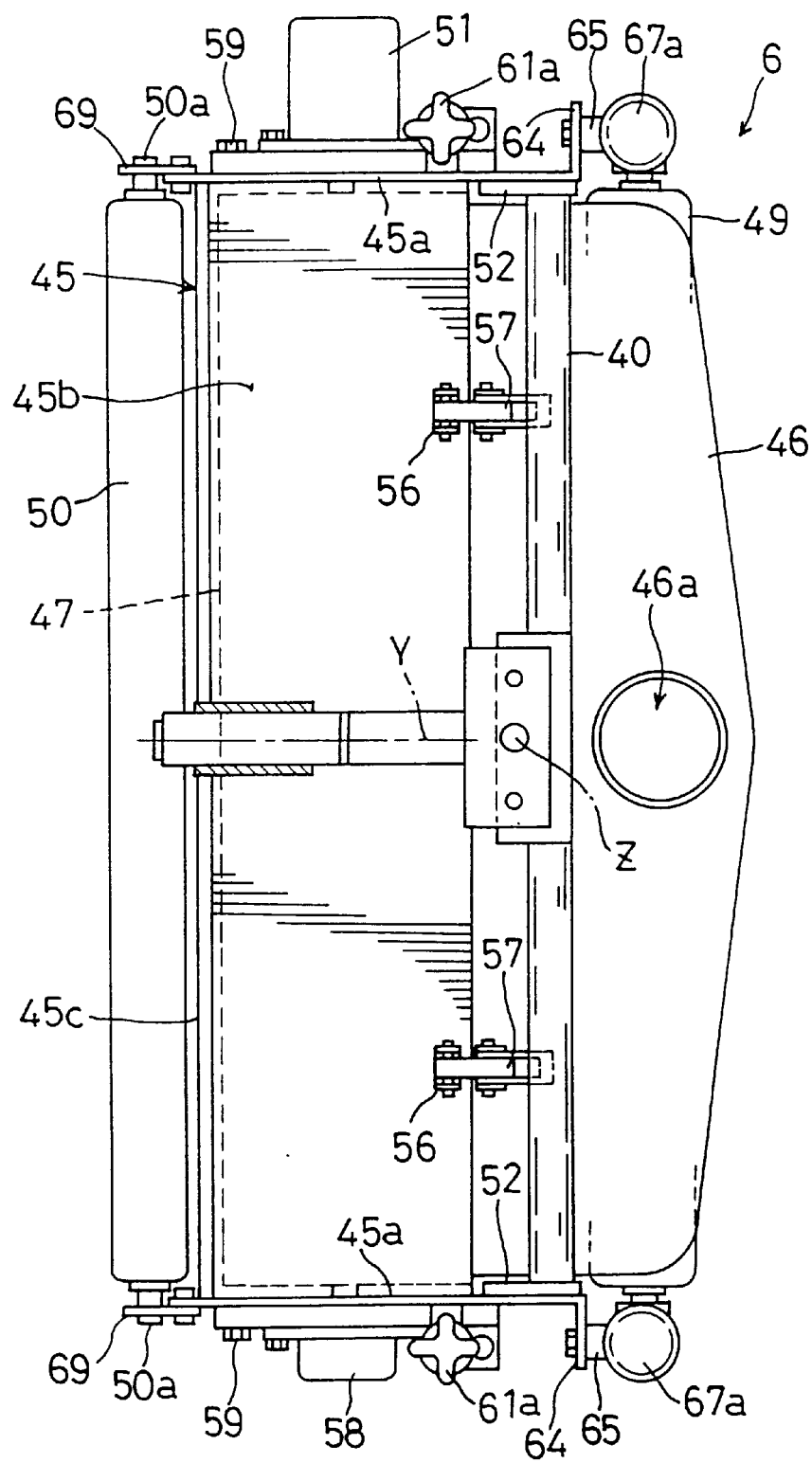
FIG. 10 is a plan view of the reel-type cutting unit.

The three reel-type cutting units 6 have substantially the same construction. The construction thereof will be described, taking the center cutting unit 6 for example. As shown in FIGS. 8 through 10, the reel-type cutting unit 6 has a reel housing formed of a main case body 45 and a guide 46. The main case body 45 includes side wall members 45a arranged right and left, an upper wall member 45b and a rear wall member 45c. The guide 46 is detachably attached to the front of the main case body 45. A reel blade 47 is supported by the side wall members 45a to be rotatable about a transverse axis. A fixed blade 48 is disposed adjacent a lower periphery of the reel blade 47. A front ground-engaging roller 49 and a rear ground-engaging roller 50 acting as gauge wheels are disposed in a front position and a rear position, respectively. One of the side wall members 45a supports a hydraulic motor 51 for driving the reel blade 47. Props 52 extend upward from the side wall members 45a to be pivotal relative thereto about a rod 54 extending through front positions of the right and left side wall members 45a. The main frame 40 extends parallel to the rotational axis of reel blade 47 and interconnects upper ends of the props 52. Thus, during an operation, the reel-type cutting unit 6 is capable of pitching about the rod 54 to follow the ground reliably. Further, the right and left side wall members 45a have stoppers 43 disposed in upper positions thereof for contacting the props 52 when the cutting unit 6 is raised from the ground, to set a limit to the pitching of the cutting unit 6.

The rear wall member 45c is openable and closable by pivoting about a transverse axis 53. The guide 46 is shaped to a bag-like form communicating rearwardly with the interior of main case body 45, and defining a discharge opening 46a which opens upward in a front position. The guide 46 defines also a grass receiving space 100 therein. The first duct 7a is connected to the discharge opening 46a. The discharge opening 46a is disposed in a transversely middle position in plan view. Angled guide surfaces 46b are formed which project forward in the middle in plan view to guide grass clippings to the discharge opening 46a. The main case body 45 includes a rod 54 extending transversely in a lower position of a front opening thereof. The guide 46 includes a pair of right and left pinching elements 55 formed of a spring material and arranged at lower ends of a rear opening edge thereof for elastically holding the rod 54. The guide 46 further includes a pair of right and left buckles 57 arranged on an upper surface thereof for engaging a pair of engaging pieces 56 on the upper wall member 45a. Thus, the guide 46 is detachable attached to the main case body 45.

As shown in FIG. 9, a sufficient space is secured between the ground and the front positions of the right and left side wall members 45a to define an air inflow path 44.

The reel blade 47 is rotatable in the direction indicated by an arrow in FIG. 9. That is, the rotating direction is set so that the periphery opposed to the ground moves rearwardly of the vehicle body. In operation, grass clippings cut by the reel blade 47 and fixed blade 48 are transmitted upward from a lower position through a rear position in the case, by contact with the reel blade 47 or by wind pressure produced by rotation. The grass clippings are transmitted forwardly inside the guide 46 by a sufficiently strong feeding force. After being guided to the transversely middle position by the inclined surfaces 46b of guide 46, the grass clippings are transmitted upward from the discharge opening 46a. Subsequently, the grass clippings are transmitted to the grass catcher 5, to be collected therein, through the first duct 7a, merging member 7b, second duct 7c, suction blower 8 and receiving tube 16.

As shown in FIG. 10, the reel blade 47 has a drive shaft 47a supported at one end thereof by one of the side wall members 45a through a bearing 58 and at the other end by the other side wall member 45a through the hydraulic motor 51. The bearing 58 and hydraulic motor 51 are pivotably supported by support shafts 59 arranged on an axis disposed rearwardly of and extending parallel to the drive shaft 47a. Taking the side with the hydraulic motor 51 for example, as shown in FIG. 8, the side wall member 45a includes a screw shaft 61 meshed with a nut 60 disposed in a front position. By turning a knob 61a of screw shaft 61, the drive shaft 47a is vertically adjustable to adjust spacing with the fixed blade 48.

As shown in FIGS. 8, 11A and 12A, the front ground-engaging roller 49 has a support shaft 49a extending over an entire width thereof. The support shaft 49a supports metallic roller portions 49b arranged at opposite ends to be freely rotatable thereon, and grass pickup portions arranged in intermediate positions to be freely rotatable thereon which include alternately arranged large-diameter portions 49c and small-diameter portions 49d. The rear ground-engaging roller 50 has a constant diameter throughout, and is freely rotatably supported on a support shaft 50a. The forward ends of right and left side wall members 45a are bent laterally outward to define vertical support flanges 64. Support members 65 are fixed with bolts 66 to the front surfaces of right and left flanges 64. Screw shafts 67 extend vertically through the support members 65 in threaded engagement therewith, each screw shaft having a turn knob 67a disposed at an upper end thereof and a support piece 68 disposed at a lower end. The support shaft 49a of front ground-engaging roller 49 is supported by the right and left support pieces 68. As shown in FIGS. 11B and 12B, The support members 65 may be connected also to the rear surfaces of flanges 64.

That is, the flanges 64 define bores (not shown) for receiving the bolts 66. When the support members 65 are connected to the front surfaces of flanges 64, a grass cutting position of reel blade 47 and a ground-engaging point of front ground-engaging roller 49 have an increased distance D therebetween. When the support members 65 are connected to the rear surfaces of flanges 64, as shown in FIGS. 11B and 12B, the grass cutting position of reel blade 47 and the ground-engaging point of front ground-engaging roller 49 have a decreased distance d therebetween. With the increased distance D, time is provided to erect grass flattened under pressure of front ground-engaging roller 49, to cut the grass restored to an upstanding posture. With the decreased distance d, the cutting unit may follow even minor ruggedness of the ground with high precision. By turning the knobs 67a, an amount of downward projection of front ground-engaging roller 49 may be varied to adjust a grass cutting height.

As shown in FIGS. 8 and 9, a plate 69 defining numerous bores 69a arranged vertically is connected to an outer surface in a rearward position of each of the right and left side wall members 45a by means of bolts 70 penetrating selected bores 69a. The support shaft 50a of rear ground-engaging roller 50 is supported by the right and left plates 69. By selecting the bores 69a penetrated by the bolts 70, an amount of downward projection of rear ground-engaging roller 50 may be varied to adjust a grass cutting height.

Figure 13:
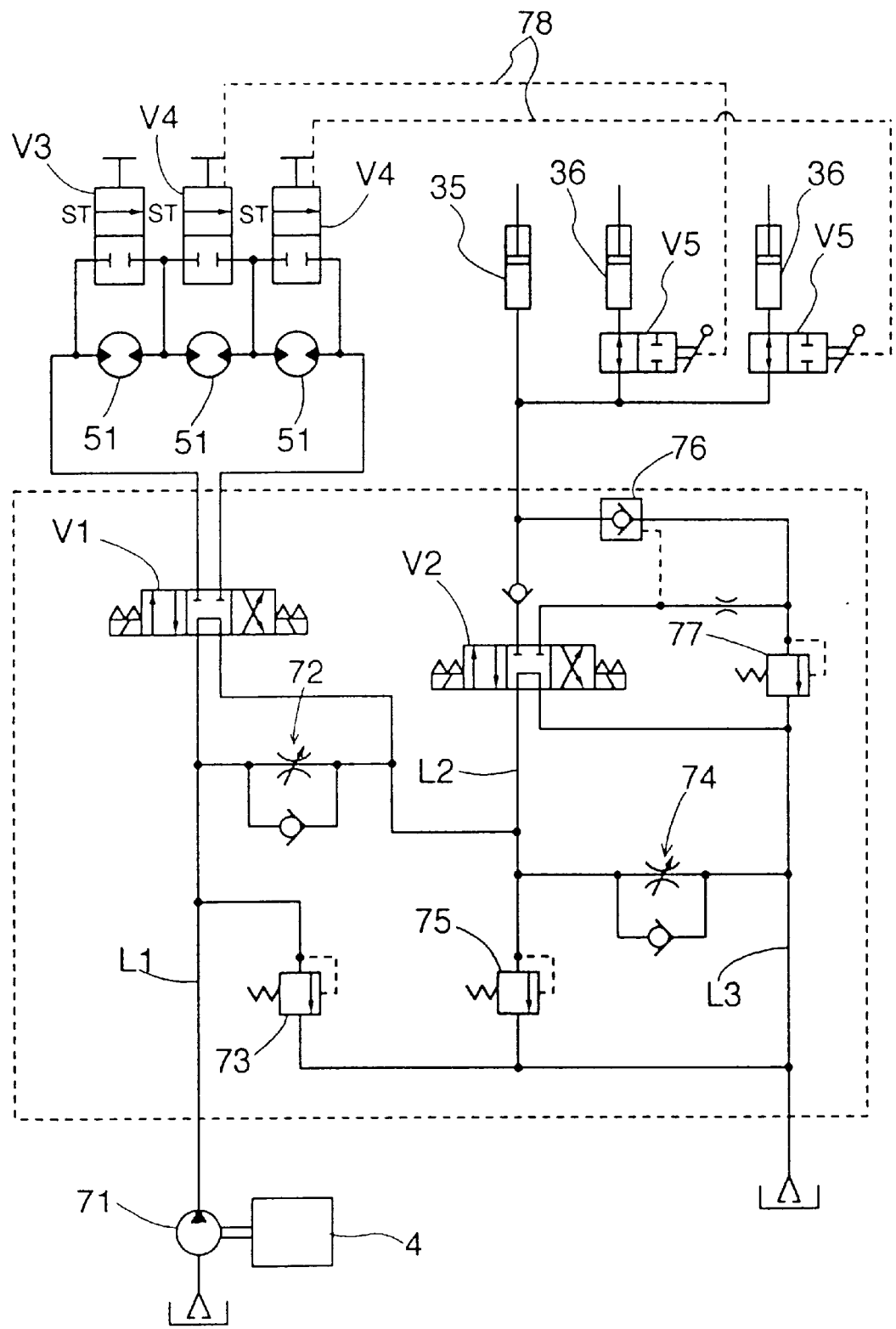
FIG. 13 is a diagram of a hydraulic circuit for controlling the reel-type cutting units.
Figure 14:
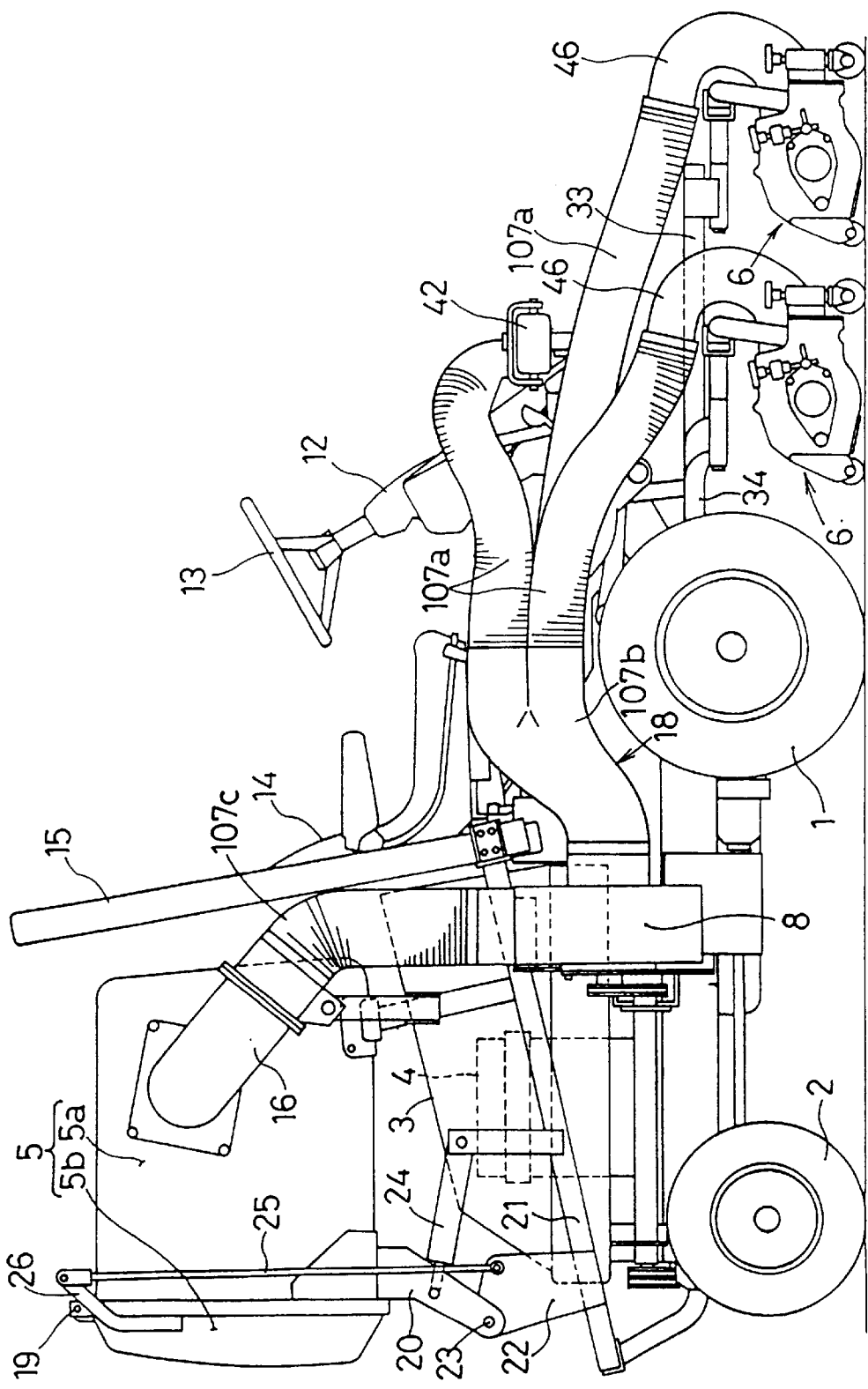
FIG. 14 is a side elevation of a lawn tractor in a second embodiment of this invention.
Figure 15:
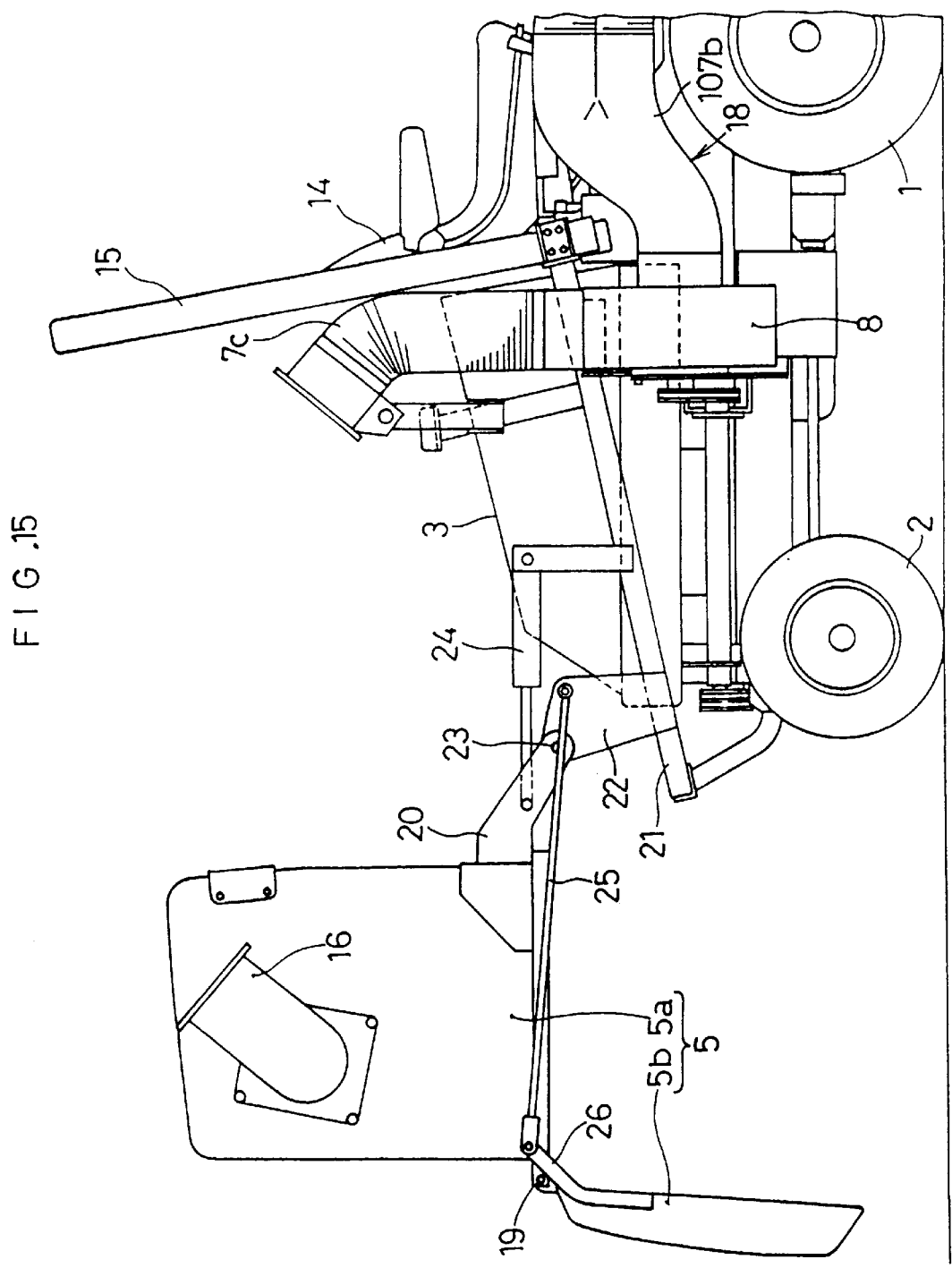
FIG. 15 is a side view of a grass catcher in a discharge position of the lawn tractor shown in FIG. 14.
Figure 16:
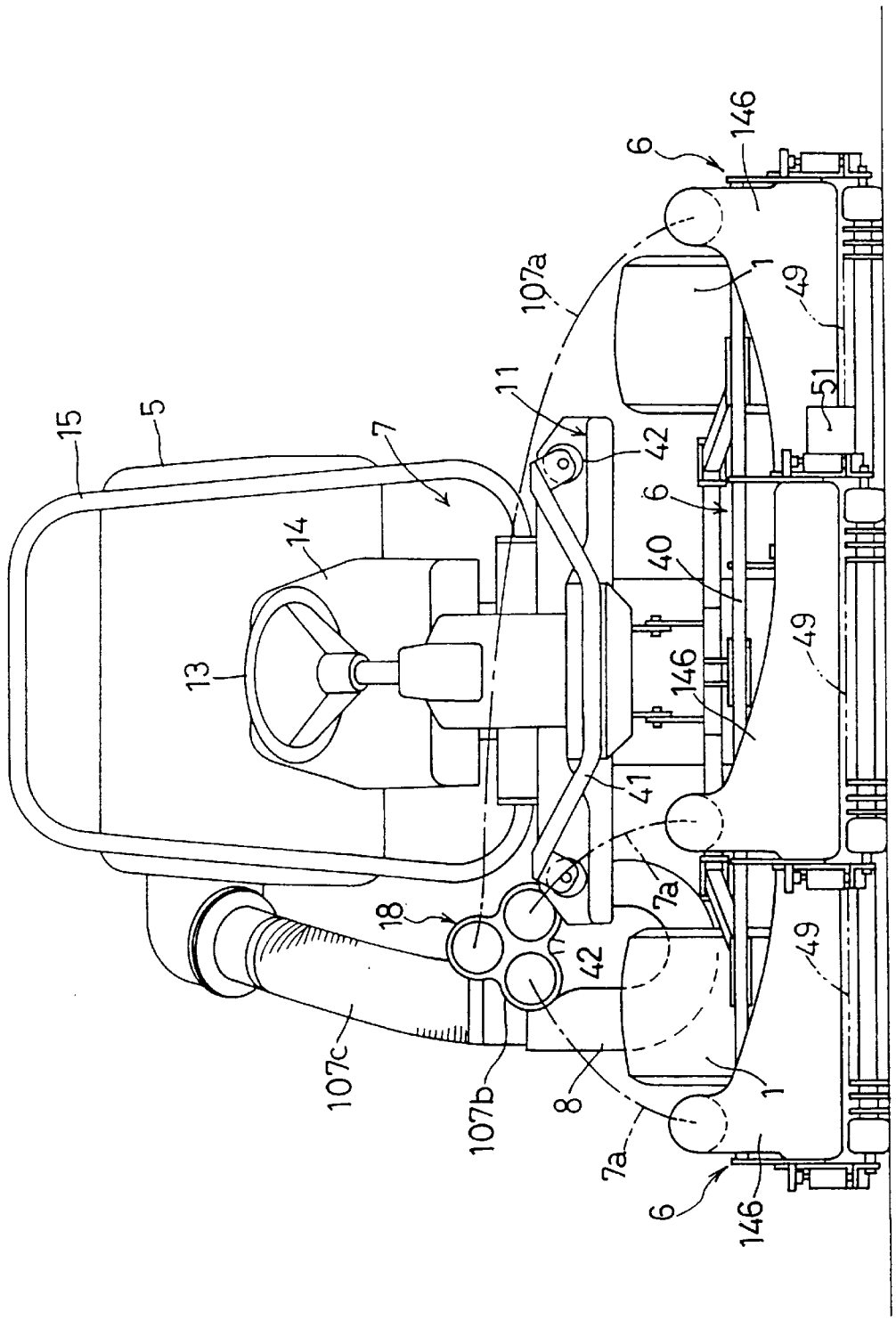
FIG. 16 is a front view of the lawn tractor shown in FIG. 14.
Figure 17:
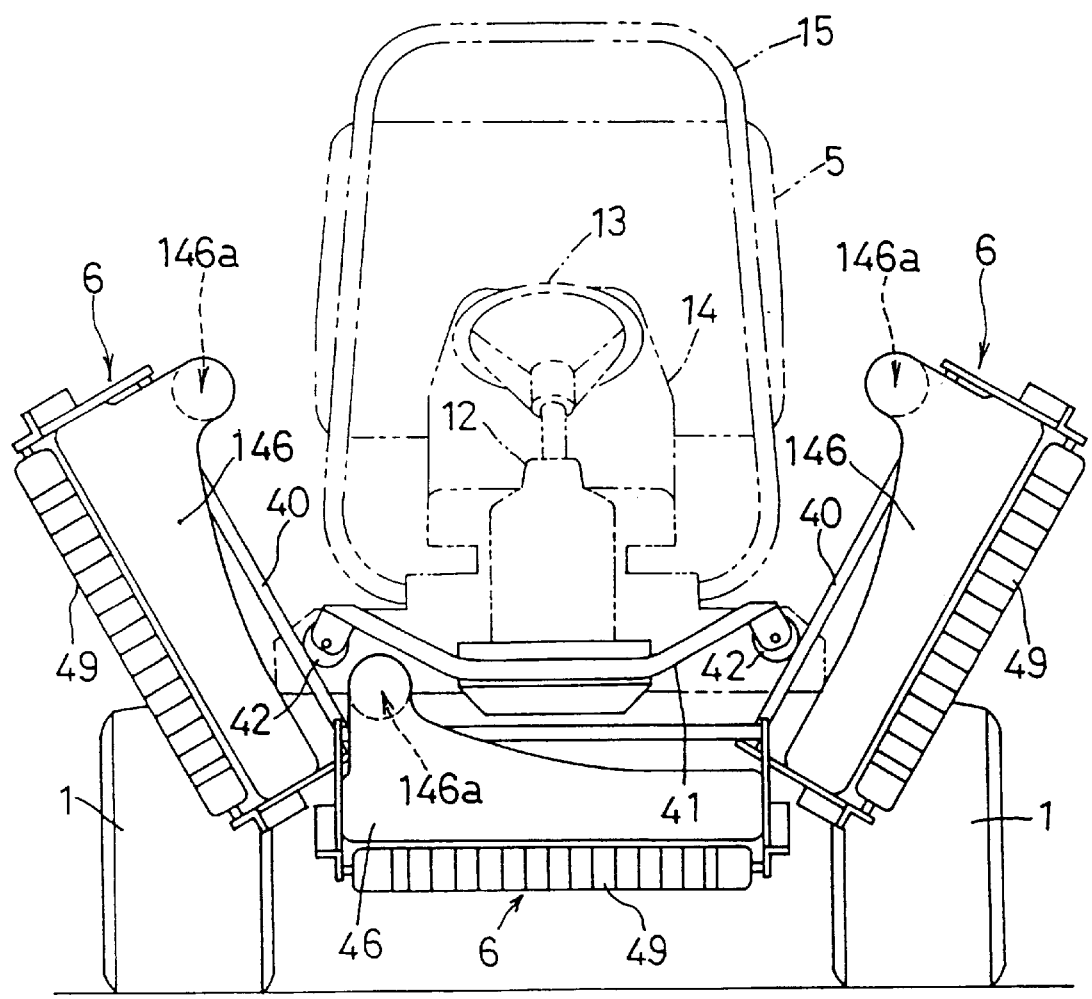
FIG. 17 is a front view showing reel-type cutting units in a raised position of the lawn tractor shown in FIG. 14

FIG. 13 shows a hydraulic circuit for controlling the three hydraulic motors 51 and the first and second lift cylinders 35, 36 and 36. This hydraulic circuit includes a path for transmitting hydraulic oil from a hydraulic pump 71 driven by the engine 4, through a first oil line L1 and a first electromagnetic valve V1, to the three hydraulic motors 51 arranged in series. A second oil line L2 receives hydraulic oil branching off from the first oil line L1 and return oil from the first electromagnetic valve V1. A second electromagnetic valve V2 is mounted on the second oil line L2 for controlling the first and second lift cylinders 35, 36 and 36. A drain oil line L3 is formed for draining return oil from the second electromagnetic valve V2. This hydraulic circuit further includes switch valves V3, V4 and V4 for driving and stopping the three hydraulic motors of the center reel-type cutting unit 6 and right and left reel-type cutting units 6 arranged transversely. A first variable throttle valve 72 is disposed between the first oil line L1 and second oil line L2 for adjusting driving speed of hydraulic motors 51. A first relief valve 73 is disposed between the first oil line L1 and drain oil line L3 for securing a driving pressure for the hydraulic motors 51. A second variable throttle valve 74 is disposed between the second oil line L2 and drain oil line L3 for adjusting raising speed of the first and second lift cylinders 35, 36 and 36. A second relief valve 75 is disposed between the second oil line L2 and drain oil line L3 for securing a driving pressure for the first and second lift cylinders 35, 36 and 36. A check valve 76 is mounted on an oil line branched from an oil line which transmits hydraulic oil from the second electromagnetic valve V2 to the first and second lift cylinders 35, 36 and 36, which check valve is opened by a pilot pressure when the first and second lift cylinders 35, 36 and 36 are in a lowering operation. A third relief valve 77 is disposed on a drain oil line side of the check valve 76 for applying a back pressure to the first and second lift cylinders 35, 36 and 36 to reduce a ground-engaging pressure of the reel-type cutting units 6.

The first electromagnetic valve V1 is switchable to three positions for forward rotation, backward rotation and stopping of the hydraulic motors 51. The second electromagnetic valve V2 is operable to three positions for raising, lowering and stopping the reel-type cutting units 6. In operation, the first electromagnetic valve V1 is set to the forward position to supply hydraulic oil to the respective hydraulic motors 51, and the second electromagnetic valve V2 is set to the lowering position to lower the reel-type cutting units 6 until the front and rear ground-engaging rollers 49 and 50 contact the ground. In this state, the cutting units 6, with the back pressure applied from the third relief valve 77, are lightly movable in flotation following any unevenness of the ground.

Descent stopper valves V5 are mounted on oil lines connected to the right and left second lift cylinders 36 and 36 for stopping drainage of hydraulic oil from the cylinders to prevent descent of the right and left cutting units 6. The descent stopper valves V5 are interlocked to the switch valves V4 through restricting mechanisms 78 including wires and the like, to stop the hydraulic motors 51 of the side cutting units 6 when the stopper valves are closed. For carrying out an operation with only one of the side cutting units 6 maintained in the raised position, the second electromagnetic valve V2 is operated to supply hydraulic oil to the first and second lift cylinders 35, 36 and 36 to raise the three cutting units 6, and thereafter the descent stopper valve V5 corresponding to the side cutting unit 6 to remain raised is closed to shut the oil line and open the corresponding switch valve V4 at the same time. As a result, even if the second electromagnetic valve V2 is switched to operate the first and second lift cylinders 35, 36 and 36 to the lowering position, descent of that side cutting unit 6 is stopped and the hydraulic motor 51 of the cutting unit 6 is stopped.

In this invention, as noted hereinbefore, each reel-type cutting unit 6 has a guide 46 disposed in a front position thereof. Grass clippings cut by the shearing action of reel blade 47 and fixed blade 48 are fed into the guide 46 by a sufficient feeding force applied to the grass clippings through contact with the reel blade 47 or due to a wind force generated by the rotating reel blade 47. When the grass clippings are fed forward from the reel blade 47 as above, ambient air is drawn into the main case body 45 through the air inflow path 44 below the side wall members 45a. Since the grass clippings are fed with a sufficient amount of air flow, the grass clippings are driven by a strong feeding force along the inclined surfaces 46b to the transversely middle position to be discharged through the discharge opening 46a without stalling inside the guide 46. In addition, a negative pressure is applied from the suction blower 8 to the discharge opening 46a, which assures an excellent grass cutting and collecting result, leaving no grass clippings on the ground. When the rear wall member 45c is closed to act as a lid as shown in FIG. 9, grass clippings fed by the reel blade 47 are discharged through the discharge opening 46a as noted above. When the rear wall member 45c is swung upward about the pivotal axis 53 to an open position, grass clippings may be discharged from the case through the opening formed. Thus, switching may be made between an operation for collecting grass clippings and an operation for throwing out the grass clippings without removing the first duct 7a.

Depending on conditions of the ground, the reel-type cutting unit may be subjected to a resistance acting laterally thereof. In such a case, the cutting unit is allowed to pivot about the vertical axis Z, thereby avoiding an excessive external force acting thereon. Moreover, during this pivotal movement, the discharge opening 46a is displaceable only by a small amount. There is little chance of the pivotal movement being prevented by a resistance from the first duct 7a. Only little play may be provided between the discharge opening 46a and the first duct 7a to allow the pivotal movement.

A lawn tractor in another embodiment of this invention will be described next with reference to FIGS. 14 through 21. This embodiment is different from the preceding embodiment in that the guide has a discharge opening formed downstream of the air flows produced by the spiral reel blade, that the grass receiving space is curved substantially in arcuate form in a vertical plane to reverse the transport direction of grass clippings, and that, as a result, the duct construction is altered. The second embodiment is the same as the first embodiment in the other aspects. Like reference numerals are used to identify like parts and will not be described again.

The duct 7 includes three flexible front ducts 107a for transmitting grass clippings from the three reel-type cutting units 6, respectively, a large-diameter main duct 107b for joining the three front ducts 107a in a right position of the vehicle body and transmitting grass clippings to the suction blower 8, and a rear duct 107c extending from the suction blower 8 to the grass catcher 5. The suction blower 8 is disposed in a right position the vehicle body, has a suction force thereof divided into three equal parts at a three-forked merging portion 18 of the main duct 107b. A device may be employed for conveniently equalizing grass transporting capabilities of the three reel-type cutting units 6. For this purpose, the front ducts 107a of varied lengths according to the arrangement of the cutting units 6 may have varied opening areas at the three-forked merging portion 18, such that the suction force by blower 8 is increased in the order of length of the three front ducts 107a.

Grass clippings delivered upward from the suction blower 8 through the rear duct 107c enter the receiving tube 16 of grass catcher 5 through an opening formed in oblique posture at the upper end of the rear duct 107c. The three-forked merging portion 18 is in a form to connect the three front ducts 107a smoothly to the main duct 107b. The three-forked merging portion 18 is fixedly supported in the right position of the vehicle body.

In this embodiment also, the three reel-type cutting units 6 have substantially the same construction. The construction thereof will be described, taking the center cutting unit 6 for example.

Figure 19:
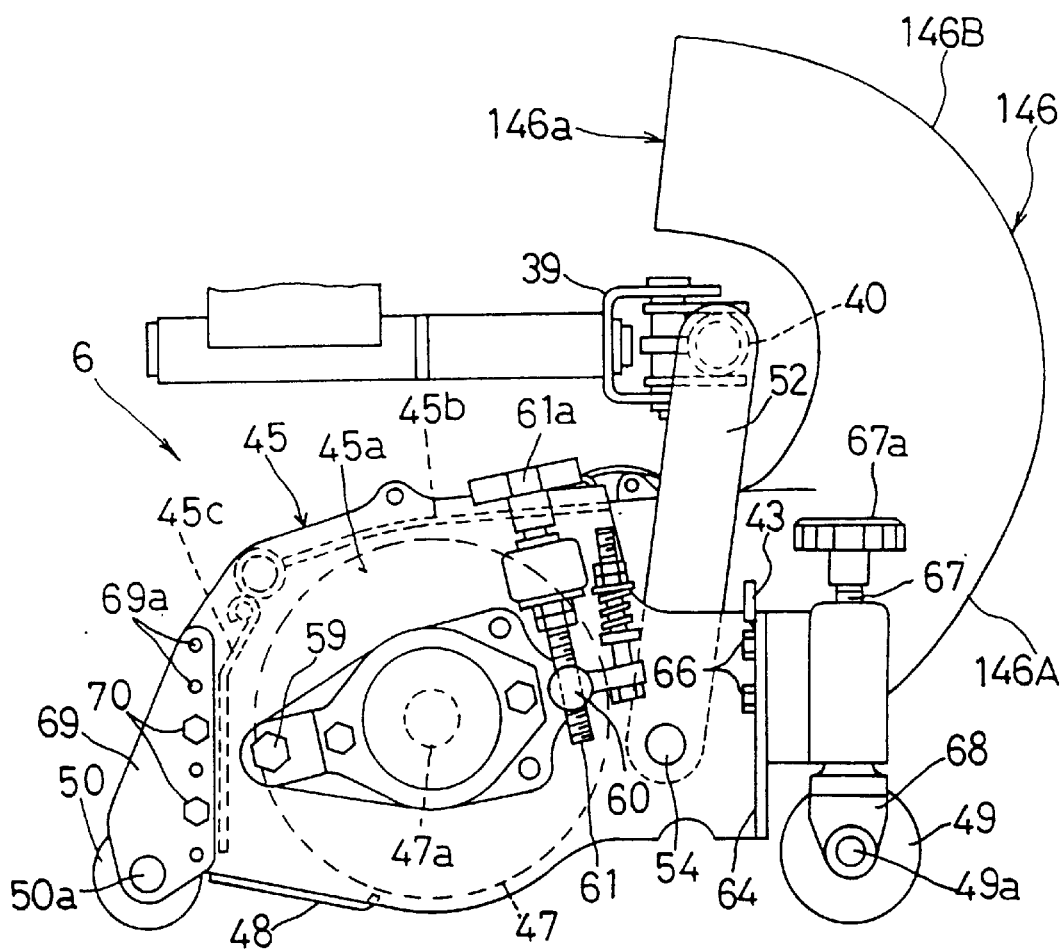
FIG. 19 is a side view of a reel-type cutting unit.
Figure 20:
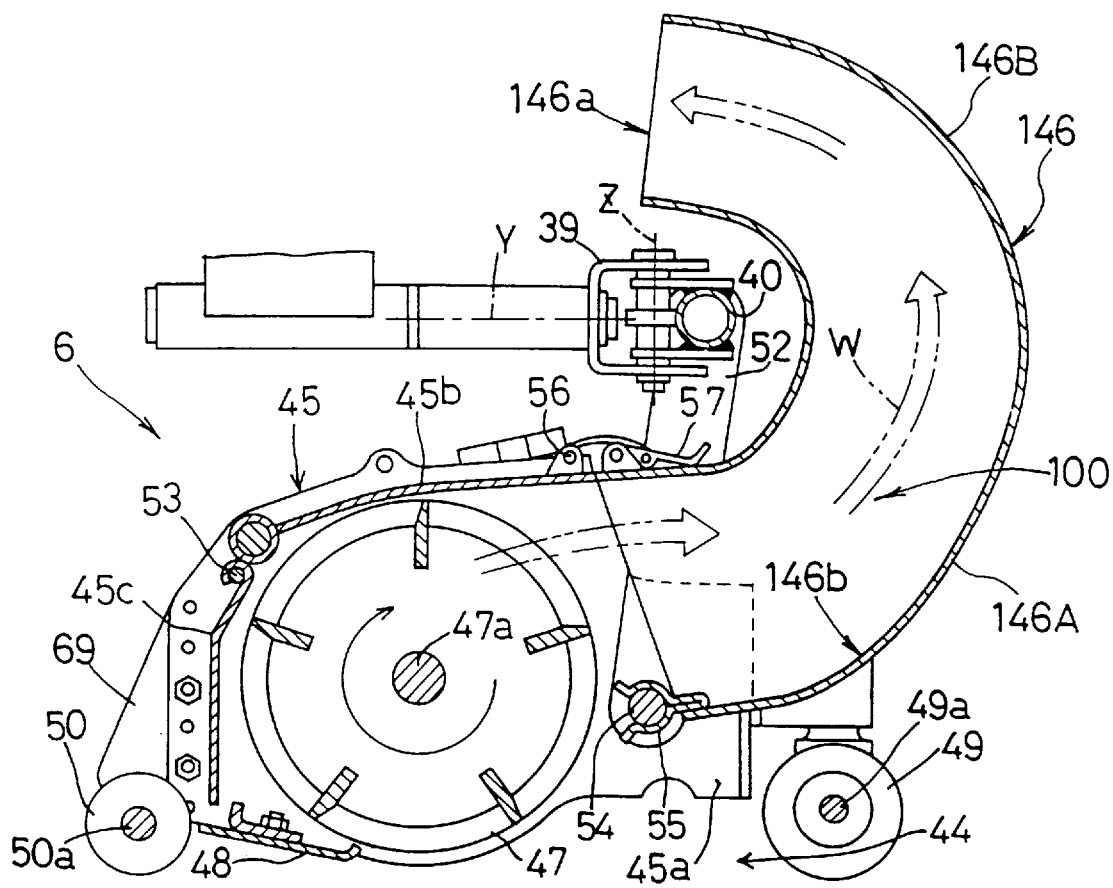
FIG. 20 is a side view in vertical section of the reel-type cutting unit.
Figure 21:
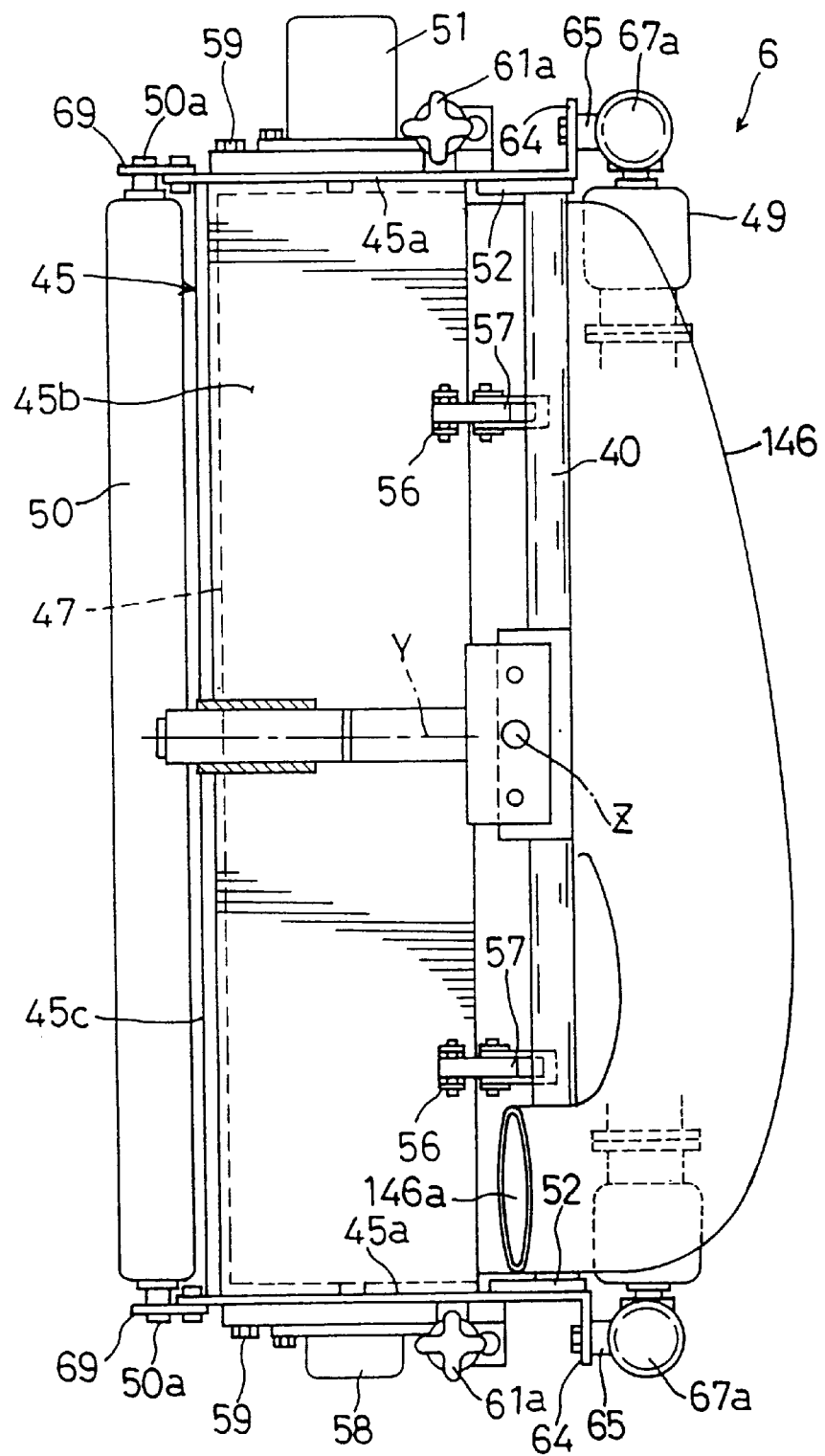
FIG. 21 is a plan view of the reel-type cutting unit.

As shown in FIGS. 19 through 21, the reel-type cutting unit 6 has a reel housing formed of a main case body 45 and a guide 146. The main case body 45 includes side wall members 45a arranged right and left, an upper wall member 45b and a rear wall member 45c. The guide 146 is detachably attached to the front of the main case body 45. A reel blade 47 is supported by the side wall members 45a to be rotatable about a transverse axis. A fixed blade 48 is disposed adjacent a lower periphery of the reel blade 47. A front ground-engaging roller 49 and a rear ground-engaging roller 50 acting as gauge wheels are disposed in a front position and a rear position, respectively. One of the side wall members 45a supports a hydraulic motor 51 for driving the reel blade 47.

The guide 146 defines a bag-like grass receiving space 100 including a downstream passage portion 146B having a discharge opening 146a directed rearward for coupling to the front duct 107a in an upper position of the cutting unit 6, and an upstream passage portion 146A for gathering grass clippings in a transverse direction and feeding the grass clippings to the downstream passage portion 146B. These upstream and downstream passage portions 146A and 146B constitute a grass transport passage W which, in side view, bulges forward in arcuate form.

The upstream passage portion 146A includes an inclined surface 146b protruding progressively forward as it extends transversely toward the downstream passage portion 146B in plan view to direct grass clippings fed forward the sideways elongated reel blade 47 toward the downstream passage portion 146B. The discharge opening 146*a* is disposed in an offset position toward which grass clippings are directed in the upstream passage portion 146A by rotation of the spiral reel blade 47. That is, the discharge opening 146*a* is disposed in a rightward position with respect to the moving direction of the tractor.

Figure 18:
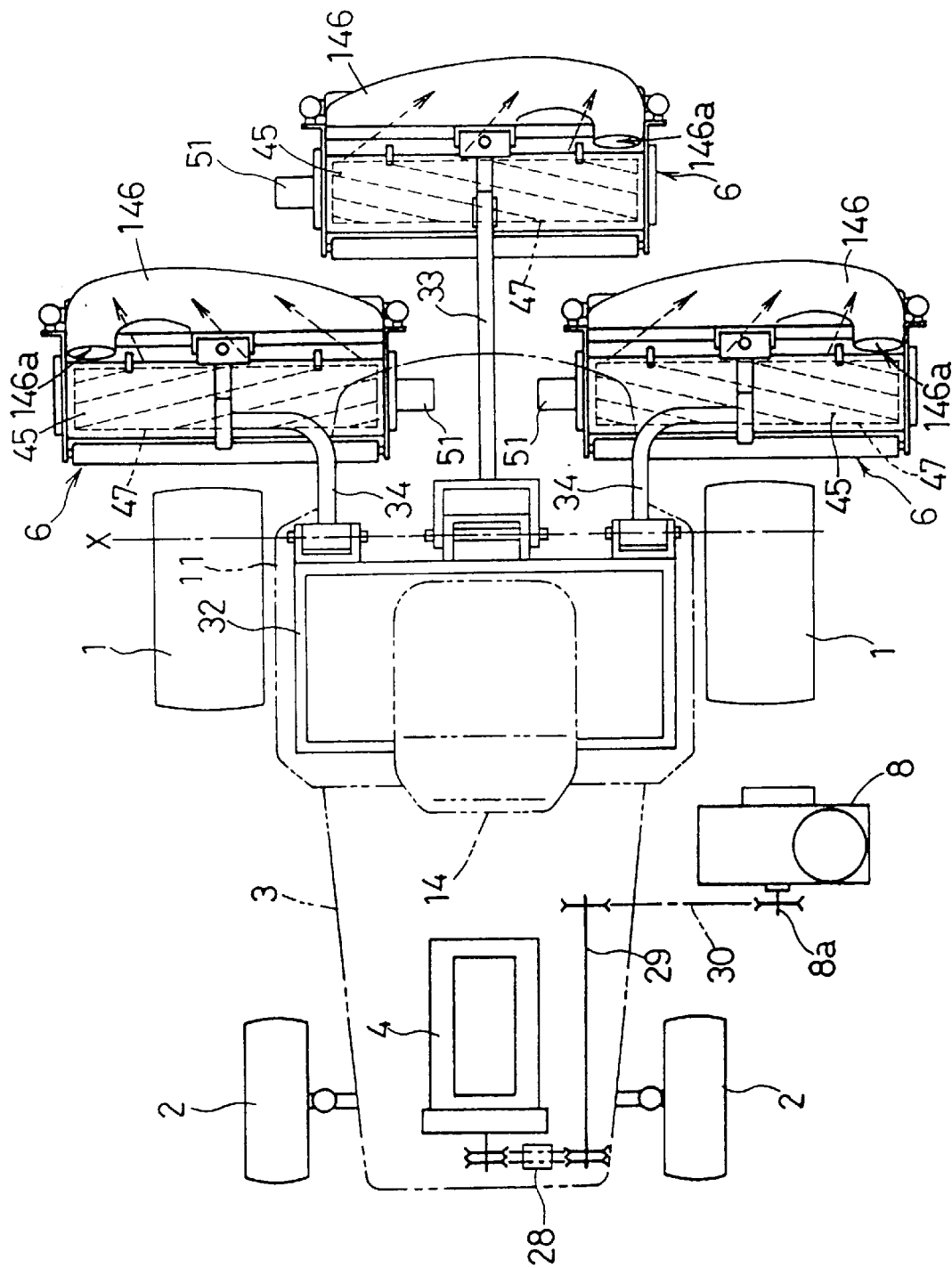
FIG. 18 is a schematic plan view of the lawn tractor shown in FIG. 14.

The other guides 146 have a similar basic structure. The reel blade 47 of the left cutting unit 6 has an opposite spiraling direction to those of the other two cutting units 6. Therefore, the guide 146 of the left cutting unit 6 has the downstream passage portion 146B offset to the left of the upstream passage portion 146A (FIG. 18).

The main case body 45 includes a rod 54 extending transversely in a lower position of a front opening thereof. The guide 146 includes a pair of right and left pinching elements 55 formed of a spring material and arranged at lower ends of a rear opening edge thereof for elastically holding the rod 54. The guide 146 further includes a pair of right and left buckles 57 arranged on an upper surface thereof for engaging a pair of engaging pieces 56 on the upper wall member 45*a*. Thus, the guide 146 is detachable attached to the main case body 45.

As shown in FIG. 20, a sufficient space is secured between the ground and the front positions of the right and left side wall members 45*a* to define an air inflow path 44. The reel blade 47 is rotatable in the direction indicated by an arrow in FIG. 20. That is, the rotating direction is set so that the periphery opposed to the ground moves rearwardly of the vehicle body. In operation, grass clippings cut by the reel blade 47 and fixed blade 48 are transmitted upward from a lower position through a rear position in the case, by contact with the reel blade 47 or by wind pressure produced by rotation. The grass clippings are transmitted forwardly inside the guide 146 by a sufficiently strong feeding force. After being gathered in the transverse direction by the inclined surface 146*b* of upstream passage portion 146A and guided into the downstream passage portion 146B, the grass clippings are transmitted rearward or rearward and upward from the discharge opening 146*a*. Subsequently, the grass clippings are transmitted to the grass catcher 5, to be collected therein, through the front duct 107*a*, three-forked merging portion 18, main duct 107*b*, suction blower 8, rear duct 107*c* and receiving tube 16.

What is claimed is:

1. A reel mower apparatus comprising:
    a vehicle body;
    a grass catcher attached to said vehicle body;
    a reel-type cutting unit coupled to said vehicle body and including:
        a fixed blade disposed adjacent the ground;
        a reel blade for cutting grass in cooperation with said fixed blade, said reel blade rotatable about a horizontal axis extending transversely of said vehicle body to move from front to rear relative to said fixed blade with respect to a forward traveling direction of said vehicle body;
        a main case surrounding said reel blade to define a space for carrying grass clippings in a rotating direction of said reel blade to a top level of said reel blade; and
        a guide member connected to said main case for receiving the grass clippings carried to said top level, said guide member defining a grass receiving space having a grass discharge opening, wherein the grass clippings after cutting by said fixed blade and said reel blade are received in said grass receiving space and are transported through said grass receiving space to said grass discharge opening entirely by air flow generated by rotation of said reel blade; and
    duct means having two ends, with one end thereof connected to said grass discharge opening and the other end connected to said grass catcher for transporting the grass clippings entrained by the air flow.

2. A reel mower apparatus as defined in claim 1, wherein said grass receiving space is located forwardly of said reel blade with respect to said forward traveling direction of said vehicle body.

3. A reel mower apparatus comprising:
    a vehicle body;
    a grass catcher attached to said vehicle body;
    a reel-type cutting unit coupled to said vehicle body and including:
        a fixed blade disposed adjacent the ground,
        a reel blade for cutting grass in cooperation with said fixed blade, said reel blade rotatable about a horizontal axis extending transversely of said vehicle body to move from front to rear relative to said fixed blade with respect to a forward traveling direction of said vehicle body;
        a main case surrounding said reel blade to define a space for carrying grass clippings in a rotating direction of said reel blade to a top level of said reel blade; and
        a guide member connected to said main case for receiving the grass clippings carried to said top level, said guide member defining a grass receiving space having a grass discharge opening, wherein the grass clippings after cutting by said fixed blade and said reel blade are received in said grass receiving space and are transported through said grass receiving space to said grass discharge opening entirely by air flow generated by rotation of said reel blade; and
    duct means having two ends with one end thereof connected to said grass discharge opening and the other end connected to said grass catcher for transporting the grass clippings entrained by the air flow, wherein said grass discharge opening is located adjacent a middle position of said reel blade extending transversely of said vehicle body, said grass receiving space having a width perpendicular to said horizontal axis enlarging toward said grass discharge opening to reach a maximum width in a position of said grass discharge opening.

4. A reel mower apparatus as defined in claim 1, wherein said reel blade is in spiral form, said grass discharge opening being located downstream of air flows produced by said reel blade in spiral form.

5. A reel mower apparatus as defined in claim 1, wherein said grass receiving space is curved substantially in arcuate form in a vertical plane to reverse a transport direction of the grass clippings.

6. A reel mower apparatus as defined in claim 1, wherein said guide member is detachably attached to said main case.

7. A reel mower apparatus as defined in claim 1, wherein said main case includes side walls with lower edges thereof spaced from the ground to define an air intake path for allowing air inflow.

8. A reel mower apparatus as defined in claim 1, wherein said main case includes a rear wall having a lid switchable between an open position and a closed position.

9. A reel mower apparatus as defined in claim 1, wherein said reel-type cutting unit is supported by said vehicle body to be pivotable about a vertical axis disposed in a middle position of said reel-type cutting unit extending horizontally and transversely of said vehicle body.

10. A reel mower apparatus comprising:

a vehicle body having a steering column;

a grass catcher attached to said vehicle body;

a plurality of reel-type cutting units coupled to said vehicle body, each of said reel-type cutting units including:
   a fixed blade disposed adjacent the ground;
   a reel blade for cutting grass in cooperation with said fixed blade, said reel blade rotatable about a horizontal axis extending transversely of said vehicle body to move from front to rear relative to said fixed blade with respect to a forward traveling direction of said vehicle body;
   a main case surrounding said reel blade to define a space for carrying grass clippings in a rotating direction of said reel blade; and
   a guide member connected to said main case for receiving the grass clippings carried, said guide member defining a grass receiving space having a grass discharge opening, the grass clippings received being transported to said grass discharge opening by air flow; and duct means for transporting the grass clippings as entrained by the air flow, said duct means including:
   a plurality of first ducts, each connected at one end thereof to said grass discharge opening;
   a second duct connected at one end thereof to said grass catcher;
   merge means connected to the other end of each of said first ducts and to the other end of said second duct; and
   a support member for attaching said merge means to said vehicle body, said merge means hanging said first ducts in front of said steering column by means of said support member.

11. A reel mower apparatus as defined in claim 10, wherein said second duct includes a blower disposed below said merge means.

12. A reel mower apparatus comprising:

a vehicle body;

a grass catcher attached to said vehicle body;

a fixed blade disposed adjacent to the ground;

a reel blade for cutting grass in cooperation with said fixed blade, said reel blade rotatable about a horizontal reel axis extending transversely of said vehicle body to move from front to rear relative to said fixed blade with respect to a forward traveling direction of said vehicle body;

a main case surrounding said reel blade to define a space for carrying grass clippings in a rotating direction of said reel blade to a top level of said reel blade, said main case having a case width extending parallel to said reel axis;

a guide member connected to said main case for receiving the grass clippings carried to said top level, said guide member defining a grass receiving space having a grass discharge opening, said grass discharge opening having a width smaller than said case width, the grass clippings received being transported through said grass receiving space to said grass discharge opening entirely by air flow; and duct means having one end thereof connected to said grass discharge opening and the other end connected to said grass catcher for transporting the grass clippings as entrained by the air flow.

13. The reel mower apparatus of claim 12, wherein said grass receiving space enlarges toward said grass discharge opening.

14. The reel mower apparatus of claim 12, wherein said grass receiving space tapers toward said grass discharge opening.

15. The reel mower apparatus of claim 12, wherein said grass discharge opening is located within the case width of the main case in plan view.

\* \* \* \* \*